Patented July 29, 1952

2,605,282

UNITED STATES PATENT OFFICE 2,605,282

PROCESS FOR PRODUCTION OF BETA-(3,4-DIHYDROXYPHENYL)-ALANINE

Edgar C. Britton and Halbert C. White, Midland, Mich., assignors to The Dow Chemical Company, Midland, Mich., a corporation of Delaware No Drawing. Application February 18, 1949, Serial No. 77,297

1 Claim. (Cl. 260—519)

This invention concerns a new process for the production of beta-(3,4-dihydroxyphenyl)-alanine. It relates more particularly to a procedure for making beta-(3,4-dihydroxyphenyl)-alanine from hydantoin and an alkoxy aromatic aldehyde having the formula:

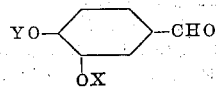

wherein one of the symbols X and Y represents a member of the group consisting of hydrogen or an alkyl radical having from 1 to 3 carbon atoms and the other represents an alkyl radical as just stated.

According to the invention, an alkoxy aromatic aldehyde, having the afore-stated general formula, is reacted with hydantoin in the presence of a dialkanolamine as a condensing agent to form the corresponding alkoxybenzylidenehydantoin. The alkoxy-benzylidenehydantoin is reduced to the alkoxy-benzylhydantoin and this latter compound is then subjected to hydrolysis with aqueous hydrobromic acid solution to form the hydrobromide salt of beta-(3,4-dihydroxyphenyl)-alanine. The beta-(3,4-dihydroxyphenyl)-alanine product is recovered from the hydrolysis mixture by concentrating the same, diluting the residue with alcohol and neutralizing the salt with ammonia.

The alkoxy aromatic aldehyde and hydantoin may be employed in any desired proportions, but for reasons of economy we usually employ from 0.8 to 1.5, preferably from 1 to 1.2, molecular proportions of hydantoin per mole of the alkoxy aromatic aldehyde used.

Reaction of the hydantoin and alkoxy aromatic aldehyde, which occurs readily at temperatures of from 50° to 100° C., is usually carried out under anhydrous or substantially anhydrous conditions in admixture with a dialkanolamine such as diethanolamine or diisopropanolamine, which is a solvent for the aromatic aldehyde and preferably in the presence of a diluent, e. g. methanol or ethanol.

The alkoxy-benzylidenehydantoin, formed by reaction of the alkoxy aromatic aldehyde and hydantoin, separates from the reaction mixture as a precipitate and upon completion of the reaction may readily be recovered by filtering. The alkoxy-benzylidenehydantoin may be converted to the corresponding alkoxy-benzylhydantoin by reduction with hydrogen, e. g. by treating an alcoholic solution of the compound with tin and hydrochloric acid, or by treating an aqueous caustic solution of the compound with sodium amalgam. However, the hydrogenation reaction is preferably carried out by catalytic hydrogenation, as for example by dissolving the alkoxy-benzylidenehydantoin in an aqueous solution containing from 4 to 10 per cent by weight of sodium hydroxide and shaking the mixture with hydrogen under pressure in the presence of a palladium-containing hydrogenation catalyst. The hydrogenation reaction may be carried out at temperatures of from 25° to 80° C., preferably from 40° to 60° C., and at pressures of from 20 to 60 pounds per square inch gauge or higher. The hydrogenation reaction is usually complete in from 1 to 4 hours under the conditions just stated. The hydrogenated solution is filtered to remove the catalyst, neutralized with hydrochloric acid and the precipitated alkoxy-benzylhydantoin separated by filtering.

The alkoxy-benxylhydantoin is then subjected to hydrolysis by heating the same at temperatures of from 100° to 150° C., in admixture with an aqueous hydrobromic acid solution of at least 20 per cent by weight concentration, in amount such that there is present in the reaction mixture 3 or more molecular proportions of hydrobromic acid per mole of the alkoxy-benzylhydantoin. The hydrobromic acid is preferably used in excess of the minimum proportion just stated. Upon completion of the hydrolysis, the reaction mixture is concentrated and excess hydrobromic acid removed by heating the mixture at temperatures of 100° C., or lower, under vacuum, to leave a residue, or concentrate, containing the hydrobromide salt of beta-(3,4-dihydroxyphenyl)-alanine. The residue is dissolved in an alcohol such as ethanol, or methanol, preferably the latter, and the solution neutralized with ammonia. The beta-(3,4-dihydroxyphenyl)-alanine thus liberated from its salt, precipitates and is separated by filtration. The beta-(3,4-dihydroxyphenyl)-alanine may be further purified by recrystallization from water or other solvent, e. g. methanol.

The following example illustrates practice of the invention, but is not to be construed as limiting the scope thereof.

Example

A mixture consisting of 608 grams (4.0 moles) of vanillin, 500 grams (5.0 moles) of hydantoin, 1200 cc. of diethanolamine and 1500 cc. of methanol was placed in a reaction vessel equipped with a reflux condenser and stirrer. The mixture was stirred and heated to a temperature of from 70°–75° C. for a period of 6 hours. Thereafter, 6 liters of water were added and an amount of an aqueous 12 normal hydrochloric acid solution sufficient to bring the mixture to a pH value of from 5 to 6. The mixture was cooled to 5° C., filtered and the precipitate washed with water and then washed with methanol. There was obtained 860 grams (3.7 moles) of 5-vanillylidene-hydantoin.

A mixture consisting of 44.8 grams (0.19 mole) of the 5-vanillylidene-hydantoin, 6.6 grams (0.14 mole) of sodium hydroxide, 180 cc. of water and 4.4 grams of a hydrogenation catalyst composed of carbon carrying 5 per cent by weight of finely divided palladium, was shaken in the presence of hydrogen in a Parr hydrogenator for 1.5 hours, at a temperature of from 40° to 50° C., under a pressure of 40 pounds per square inch gauge. The hydrogenated solution was removed from the bomb, filtered and the filtrate neutralized with 12 normal aqueous hydrochloric acid solution. The neutralized reaction mixture was cooled to 5° C., and the 5-vanillyl-hydantoin separated by filtering and washed with water. A series of 10 hydrogenation reactions as just described, gave a yield of 421 grams (1.78 moles) of 5-vanillyl-hydantoin.

A mixture consisting of 118 grams (0.5 mole) of 5-vanillyl-hydantoin and 400 cc. of an aqueous solution containing 48 per cent by weight hydrobromic acid was placed in a flask and heated at a reflux temperature, i. e. at 126° to 128° C., for a period of 18 hours. Thereafter the excess hydrobromic acid was removed by heating the mixture at subatmospheric pressure on a water bath. Heating was continued under vacuum until most of the water was removed. The residue was dissolved in 500 cc. of methanol and the solution neutralized with an aqueous 12 normal ammonium hydroxide solution. Thereafter the solution was cooled to 0° C., and maintained at this temperature for 3 hours, then filtered. There was obtained 70 grams of a gray colored product. The crude product was dissolved in 900 cc. of hot water, 10 grams of Darco, a finely divided activated charcoal, added thereto and the mixture filtered while hot. The filtrate was cooled to 5° C., and filtered to separate the purified beta-(3,4-dihydroxyphenyl)-alanine. There was obtained a total of 57 grams (0.29 mole) of beta-(3,4-dihydroxyphenyl)-alanine as a nearly white product, having a melting point of 267°–268° C.

Other modes of applying the principle of the invention may be employed instead of those explained, change being made as regards the method herein disclosed, provided the steps or compounds stated in the following claim or the equivalent of such stated steps or compounds be employed.

We claim:

The method of making beta-(3,4-dihydroxyphenyl) alanine which consists in reacting at temperatures of from 50° to 100° C., a mixture of one molecular proportion of vanillin and from 0.8 to 1.5 moles of hydantoin while in admixture with diethanolamine in amount corresponding to at least one molecular proportion of the diethanolamine per mole of the vanillin to form 5-vanillylidene-hydantoin, reducing the 5-vanillylidene-hydantoin by reacting the same at temperatures between 25° and 80° C. with hydrogen while in admixture with an aqueous solution containing from 4 to 10 per cent of sodium hydroxide and in the presence of a palladium-containing hydrogenation catalyst to form 5-vanillyl-hydantoin, heating the 5-vanillyl-hydantoin at a temperature of from 100° to 150° C. in admixture with an aqueous hydrobromic acid solution of at least 20 per cent concentration in amount such that there is present in the reaction mixture at least 3 molecular proportions of the hydrobromic acid per mole of the 5-vanillyl-hydantoin to hydrolyze the latter and form the hydrobromide of beta-(3,4-dihydroxyphenyl) alanine, concentrating the hydrolysis mixture by evaporation at temperatures below 100° C., mixing the concentrate with methyl alcohol to dissolve the beta-(3,4-dihydroxyphenyl) alanine hydrobromide, neutralizing the solution with ammonia to precipitate beta-(3,4-dihydroxyphenyl) alanine and separating the latter from the liquid.

EDGAR C. BRITTON.
HALBERT C. WHITE.

REFERENCES CITED

The following references are of record in the file of this patent:

UNITED STATES PATENTS

| Number    | Name           | Date           |
|-----------|----------------|----------------|
| 2,176,018 | Cope et al.    | Oct. 10, 1939  |
| 2,446,192 | Pfister et al. | Aug. 3, 1948   |
| 2,468,352 | Warner et al.  | Apr. 26, 1949  |
| 2,480,644 | Goldsmith et al.| Aug. 30, 1949 |
| 2,498,300 | Scott et al.   | Feb. 21, 1950  |
| 2,527,366 | Livok et al.   | Oct. 24, 1950  |

FOREIGN PATENTS

| Number  | Country     | Date          |
|---------|-------------|---------------|
| 257,403 | Switzerland | Apr. 16, 1949 |

OTHER REFERENCES

Urech: Liebigs Annalen, vol. 164, pp. 268–271 (1872). Wheeler et al.: Am. Chem., J., vol. 45, pp. 368–383 (1911). Boyd et al.: Biochem. J., vol. 29, pp. 542–554 (1935). Block: Chem. Reviews, vol. 38, pp. 527, 528, 531 (1946). Stephen et al.: J. Chem. Soc. (London), vol. 105, p. 1152 (1914). Funk: J. Chem. Soc (London), vol. 99, pp. 557–558 (1911). Foreman: Biochem. J., vol. 13, pp. 382 (1919). Deulofeu: Ber. Deut. Chem., vol. 69B, pp. 2456–2459 (1936). Henze et al.: J. Am. Chem. Soc., vol. 64, pp. 522–523 (1942).